(12) United States Patent
Adluri

(10) Patent No.: US 11,223,481 B2
(45) Date of Patent: Jan. 11, 2022

(54) ELECTRONIC DOCUMENT SIGNING USING BLOCKCHAIN

(71) Applicant: Advanced Messaging Technologies, Inc., Los Angeles, CA (US)

(72) Inventor: Mahender Raju Adluri, Tustin, CA (US)

(73) Assignee: J2 CLOUD SERVICES, LLC, Los Angeles, CA (US)

( * ) Notice: Subject to any disclaimer, the term of this patent is extended or adjusted under 35 U.S.C. 154(b) by 317 days.

(21) Appl. No.: 16/116,723

(22) Filed: Aug. 29, 2018

(65) Prior Publication Data

US 2020/0076612 A1 Mar. 5, 2020

(51) Int. Cl.
*H04L 9/32* (2006.01)

(52) U.S. Cl.
CPC .......... *H04L 9/3247* (2013.01); *H04L 9/3239* (2013.01); *H04L 2209/38* (2013.01)

(58) Field of Classification Search
CPC .. H04L 9/3247; H04L 9/3239; H04L 2209/38
See application file for complete search history.

(56) References Cited

U.S. PATENT DOCUMENTS

| | | |
|---|---|---|
| 2016/0283920 A1 | 9/2016 | Fisher et al. |
| 2017/0048216 A1 | 2/2017 | Chow et al. |
| 2017/0316390 A1* | 11/2017 | Smith .................. H04L 9/3242 |
| 2018/0082256 A1 | 3/2018 | Tummuru et al. |
| 2018/0117446 A1* | 5/2018 | Tran ..................... G06Q 20/389 |
| 2019/0182257 A1* | 6/2019 | Lee ................... G06Q 10/06315 |
| 2019/0289019 A1* | 9/2019 | Thekadath ............ H04L 9/3221 |
| 2020/0118117 A1* | 4/2020 | McManus .............. G06Q 10/10 |
| 2020/0258176 A1* | 8/2020 | Gibson ................. H04L 9/3239 |

FOREIGN PATENT DOCUMENTS

| | | |
|---|---|---|
| KR | 10-1781583 | 9/2017 |
| WO | 2017136879 | 8/2017 |

OTHER PUBLICATIONS

International Preliminary Report on Patentability for International Application No. PCT/US2019/043266 dated Mar. 11, 2021, 8 pages.

(Continued)

*Primary Examiner* — Lynn D Feild
*Assistant Examiner* — Vladimir I Gavrilenko
(74) *Attorney, Agent, or Firm* — Womble Bond Dickinson (US) LLP

(57) ABSTRACT

The systems and methods of the present disclosure can allow for uploading and signing of one or more electronic documents, e.g., by multiple users or participants. Information for each transaction (e.g., uploading, signing, verification, etc.) by the users/participants related to the uploaded and signed document further can be generated and provided to one or more blocks in a blockchain. In addition, the electronic information of the uploaded and signed document can be hashed and provided to one or more blocks in the blockchain. Accordingly, with embodiments of the present disclosure, an immutable transaction history can be provided for uploaded and electronically/digitally signed documents.

19 Claims, 10 Drawing Sheets

(56) References Cited

OTHER PUBLICATIONS

International Search Report and Written Opinion dated Oct. 29, 2019, Application No. PCT/US2019/021465.
Attores; "Digital Signing 2.0 with Smart Contracts and Blockehain on Attores"; https://www.youtube.com/watch?v=31LIYJDI3dM; available as of Nov. 7, 2016.
Examination Report for Australian Application No. 2019331368 dated Sep. 30, 2021, 4 pages.

* cited by examiner

ELECTRONIC DOCUMENT SIGNING USING BLOCKCHAIN

TECHNICAL FIELD

The present disclosure relates to electronic document signing, and in particular, electronic document signing using blockchain technology.

BACKGROUND

Existing electronic document signature methods and platforms generally are susceptible to fraud or tampering and may not be able to provide quick, efficient, and correct transaction confirmations or transaction histories to participants. Accordingly, a need exists for systems and methods for electronically or digitally signing and secure transfer of documents that provide tamper proof document transaction histories that are available to all participants, increased security for better fraud prevention, and faster transmission confirmations.

SUMMARY

Briefly described, the present disclosure is directed to systems and methods for digital or electronic document signing. The systems and methods of the present disclosure allow for uploading and signing of one or more electronic documents, e.g., by multiple users or participants. Additionally, transaction details or information relating to each transaction (e.g., uploading, signing, verification, etc.) by the users/participants related to the uploaded and signed document further can be generated and provided to one or more blocks in a blockchain. The electronic information of the uploaded and signed document also can be hashed and a hash value can be provided to one or more blocks in the blockchain. This blockchain technology generally offers an environment that provides a high level of security, compliance, transparency, and trust among participants, by applying cryptography to ensure the safety of transactions and to make transaction histories available to every participant instantly. Accordingly, with embodiments of the present disclosure, an immutable/tamper proof transaction history can be provided to all users/participants for uploaded and electronically/digitally signed documents. In addition, embodiments of the present disclosure can provide a light, fast, and trustable document management platform that has increased fraud prevention and security, as well as faster transmission confirmations, leading to loss prevention and cost savings.

For example, a system or platform can facilitate electronic or digital signing of a document(s) by two or more participants. The participants may create an account(s) through a website and/or an application, such as a mobile application, that is part of or in communication with the system/platform (e.g., the participants may generate or select user credentials, such as a user name and password, or other suitable verification information for logging into the website or application). One of the participants, e.g., a sender, may log into the website or application with their credentials and upload one or more documents (e.g., a PDF, Word® Document, etc.). The sender further may add or assign a name or label to the uploaded document(s) (e.g., in a text field of the website or smartphone application).

The system additionally generates a hash for the uploaded document(s). In one variation, the system can apply a cryptic hash function (e.g., SHA256 or RIPEMD function) to electronic information of the uploaded document(s), e.g., the system/platform can take the input as the electronic information of the document(s) and apply the hash function to convert any input length to an output of fixed length, e.g., a hash value of a fixed length. The sender also can electronically or digitally sign or otherwise provide their digital or electronic signature information to the uploaded document(s) (e.g., electronically sign with their initials, electronically sign with a sketch, or otherwise generate digital or electronic signature information). Transaction information or details of the digital signature information can be stored in one or more blocks of the blockchain, which transaction information/details can include the document hash, a date and time, participant information (e.g., a verified email ID), or other suitable information.

The sender also can send sign requests to additional participants or receivers (e.g., via email, text message, or other suitable notification means). For signing uploaded documents, the additional participants or receivers also can register with the website/application (e.g., the other participants may generate or select credentials, such as a user name and password, or other suitable verification information for logging into the website or application). The additional participants or receivers then can download the uploaded documents, and provide their digital or electronic signature information to the document(s). Transaction information or details of the digital signature information of the other participants or receivers also can be stored in one or more blocks of the blockchain (e.g., the document hash, a date and time, participant information, such as a verified email ID, etc.).

Furthermore, the receivers can return signed document(s) to the sender. The sender then can verify the signed documents and complete transactions. The document files can be stored on a file storage platform, such as InterPlanetary File System (IPFS), Amazon® Web Services S3, or other cloud-based file storage platform. The participants also can see the immutable transaction history of the uploaded and signed documents in the blockchain.

In some variations, the system for electronic document signing can have one or processors in communication with a plurality of devices each managed by a user or participant. The processor(s) further is in communication with a memory storing instructions. The processor(s) accesses a document from a first device managed by a first user of a plurality of users, and also receives signature information of the first user from the first device. The processor(s) associates the signature information with the document to form a signed document. The processor(s) also generates transaction information related to the signature information received from the first device, and provides the transaction information to a current block of a blockchain. In some variations, transaction information can include a transaction type, participant information, a status of the document, time and date information, or any other suitable information or combinations thereof. The processor(s) also generates a hash of the signed document and provides the hash of the signed document to a current block in the blockchain. For example, the processor(s) is configured to apply a hash function to electronic data or information of the signed document. The signed document can be provided to and stored in a storage, such as a cloud based storage or other suitable memory or storage.

In addition, the processor(s) provides the signed document to a second device managed by a second user of the plurality of users, and receives additional signature information of the second user from the second device (e.g., when the second user provides their digital signature information for signing the document). The additional signature information can be associated with the signed document to form an updated signed document. The processor(s) also generates additional transaction information related to the received additional signature information of the second user, and provides the additional transaction information to a current block of the blockchain. The processor(s) further generates a hash of the updated signed document (e.g., the processor(s) is configured to apply a hash function to electronic data or information of the updated signed document), and provides the hash of the updated signed document to a current block of the blockchain.

Further, the processor(s) is configured to provide the updated signed document to the first device managed by the first user, and receive verification information from the first user that the updated signed document was received or signed. The processor(s) then provide the verification information from the first user to a current block in the blockchain.

Still further, the processor(s) may be configured to display information related to the blockchain to provide a transaction history of the document, the signed document, and the updated signed document.

In further variations, a method can include receiving a document from a first device managed by a first user of a plurality of users, and receiving signature information, such as an electronic signature or other digital signature information, from the first user using the first device. The signature information can be associated with the document to form a signed document.

Transaction information that is related to the signature information received from the first user also can be generated. The transaction information can be provided to a current block of the blockchain. In one example, transaction information can include a transaction type, user information, a status of the document, time or date information, or any other suitable information or combinations thereof.

A hash of the signed document further can be generated and a hash value can be provided to a current block of the blockchain. The hash of signed document can be generated by applying a cryptographic hash function to electronic data or information of the signed document (e.g., generating the hash value of a fixed length). The signed document also can be provided to and stored in a storage, such as a cloud based storage platform or other suitable file storage platform.

In addition, the method can include providing the signed document to a second device managed by a second user of the plurality of users (e.g., upon receipt of a request from the second user to access and sign the document). Additional signature information from the second user further can be received from the second device, and the additional signature information can be associated with the signed document to form an updated signed document.

Furthermore, additional transaction information related to the received additional signature information can be generated and provided to a current block of the blockchain. A hash of the updated signed document also can be generated and provided to a current block of the blockchain (e.g., by applying a cryptographic hash function to electronic data or information of the updated signed document).

The method also can include providing the updated signed document to the first device managed by the first user and receiving verification information from the first user (e.g., when the first user verifies that that the second user or other user(s) has properly signed the updated signed document). The verification information also can be provided to a current block in the blockchain.

The method additionally can include displaying the information contained in or related to the blockchain to provide a transaction history of the document, the signed document, or the updated signed document.

Various objects, features and advantages of the present disclosure will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. While the description discloses various implementations and embodiments of the teachings, and is provided to assist in describing the teachings, the implementation, features and embodiments discussed herein should not be interpreted as a limitation on the scope or applicability of the teachings.

Figure 1:
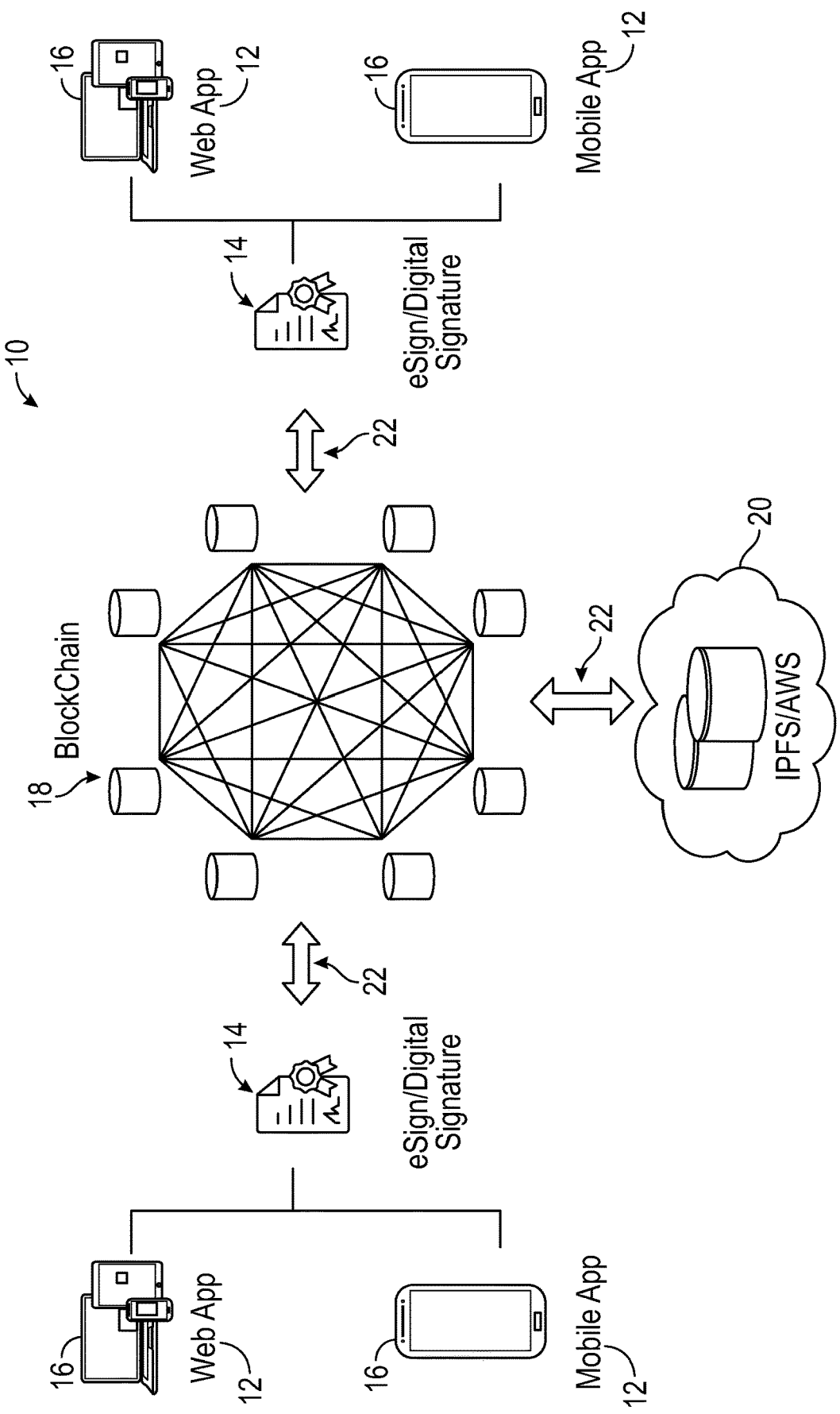
FIG. 1 shows a schematic view of a system or platform for electronic or digital document signing using blockchain.

FIG. 1 shows a schematic view of a system 10 for electronic or digital document signing using blockchain. The system 10 can include one or more computer implemented products or platforms, such as a document management provider 12, (e.g., including software products, mobile applications, web-based applications, etc.) to facilitate uploading documents (e.g., Portable File Documents (PDFs), Microsoft® Word Documents (.doc, .docx, etc.), or other suitable documents or files, such as ".tiff" documents, ".rtf" documents, ".odt" documents, etc.) and providing signature information 14 (e.g., digital or electronic signature information) thereto using a plurality of user or participant managed devices 16. The document management provider 12 further facilitates the generation of transaction information (e.g., when the users/participants upload, sign, or validate documents), as well as the generation of hashes of the documents to be provided in blocks of a blockchain 18, e.g., such that an immutable transaction history of the uploaded and signed documents can be made available for the users/participants of the system. The documents further can be stored, shared, or accessed using a cloud-based storage/computing platform 20, such as using InterPlanetary File System (IPFS), Amazon® Web Services (AWS), or other suitable web or cloud-based system or platform.

In some variations, the system or platform 10 can facilitate two or more participants or users in signing one or more documents. The participants can access the document management provider user two-factor authentication or other multifactor authentication. For example, participants may create an account(s) for access to the document management provider 12 (e.g., the participants may generate or select user credentials, such as a user name and password, or other suitable verification information for logging into a website or application related to the document management provider 12 using a managed device 16). One of the participants, e.g., a sender, may access the document management provider 12 (e.g., by logging in) with their credentials, and then, the sender can upload one or more documents (e.g., PDFs, Word® documents, e.g, ".doc," ".docx", etc., or other suitable document or file formats, such as ".tiff" documents, ".rtf" documents, ".odt" documents, etc.). The sender also may add or assign a name or label to the uploaded document(s) (e.g., in a text field of the website or application).

The system 10 or document management provider 12 can generate a hash for the uploaded document(s). In one variation, the system 10 or document management provider 12 can apply a cryptic hash function (e.g., SHA256 or RIPEMD function) to electronic information of the uploaded document(s), e.g., the system/platform can take the input as the electronic information of the document(s) and apply the hash function to convert any input length to an output of fixed length, e.g. a hash value of a fixed length.

Furthermore, the sender can electronically sign, digitally sign, or otherwise provide their digital or electronic signature information to the uploaded document(s) (e.g., electronically with initials, electronically with sketch, or otherwise generate digital or electronic signature information). Transaction information or details of the digital signature information is generated and stored in one or more blocks of the blockchain 18. The transaction information/details can include the document hash, a date and time, participant information, such as a verified email ID, or any other suitable transaction details or information or combinations thereof.

The sender subsequently can send sign requests to additional participants or receivers (e.g., via email, text messages, or another suitable messaging mechanism or notification means). For signing uploaded documents, the additional participants or receivers also can register with the website/application (e.g., the other participants may generate or select credentials, such as a user name and password, or other suitable verification information for logging into the website or application using a managed device 16) to be able to sign or log in.

While signed/logged in, the additional participants or receivers can download the uploaded and signed documents, and then, can provide their digital or electronic signature information to the document(s). Transaction information or details of the digital signature information of the additional participants or receivers also can be stored in one or more blocks of the blockchain 18 (e.g., the document hash, a date and time, participant information, such as a verified email ID, etc.). The receivers further can send the signed document(s) back to the sender, and the sender can verify and complete the transaction. The participants (e.g., the sender, receivers, or other participants) accordingly will be able to see the immutable transaction history of the uploaded and signed documents in the blockchain.

FIG. 1 further shows that the document management provider 12 or other computer implemented product can be resident on or otherwise accessed by the user or participant managed devices 16. The user managed devices 16 can include handheld mobile devices, such as mobile phones, Smart phones, tablets, PDAs, or other suitable mobile computing devices. In addition, or in the alternative, the user managed devices 16 can include personal computing devices, such as laptops, desktops, work stations, etc., though any suitable computing devices can be used without departing from the present disclosure. The devices 16 accessing or running the document management provider 12 also can be configured to access one or more networks 22, such as the Internet, peer to peer networks, or any other suitable private or public networks or combinations thereof, to enable users/participants to upload, access, and provide their signature information to the documents. The devices 16 can access the network through wired connections, e.g., an Ethernet cable, or wireless connections, e.g., WiFi, Bluetooth®, cellular connections, e.g., 3G, 4G, LTE, 5G, etc., or combinations thereof.

Each managed device 16 further can include at least one processor, such as a central processing unit (CPU) or hardware or software control logic, ROM, and/or other types of nonvolatile memory, and at least one storage or memory, such as random access memory (RAM) or (ROM). The managed devices 16 further may include one or more ports for communicating with external devices and various input and output (I/O) devices, such as a keyboard, a mouse, touchscreen and/or a video display. However, the managed devices 16 may include any suitable computing components operable to compute, calculate, determine, classify, process, transmit, receive, retrieve, originate, switch, store, display, communicate, manifest, detect, record, reproduce, handle, or utilize any form of information or data for any suitable purpose.

One or more components of the document management provider 12 can be stored in a memory and executed or otherwise accessed by the processor(s) of the managed devices 16. In addition or in the alternative, however, one or more components of the document management provider 12 can be stored and/or accessed from other computing devices (e.g., having processors and memories and/or storages) in communication with the devices 16. For example, one or more components of the document management provider 12 can be web-based or cloud-based and can be stored and accessed from one or more memories or storages of a computing device (such as a server) that is part of a data management center managed by a web or cloud service provider or other suitable entity.

Figure 2:
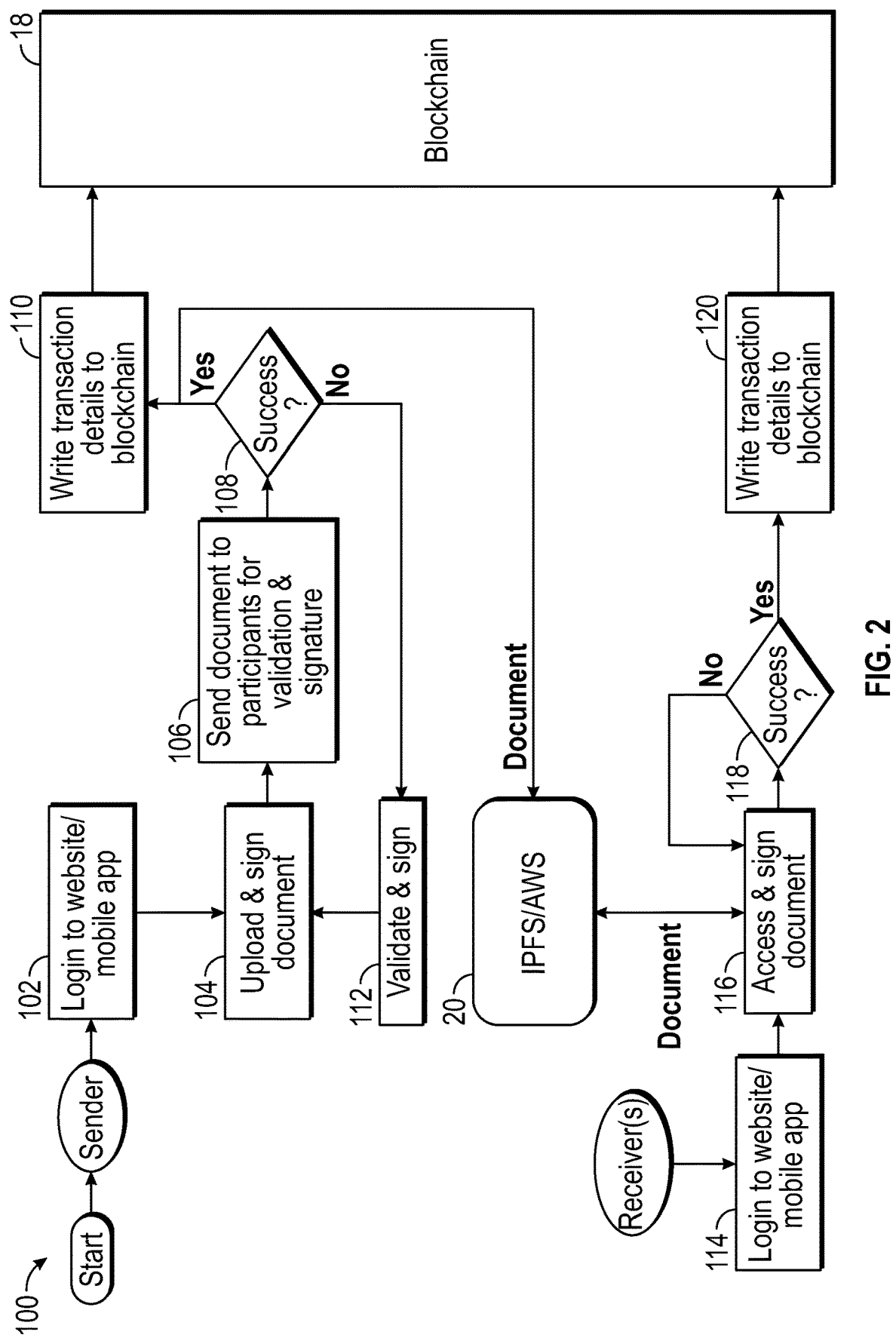
FIG. 2 shows a flowchart for electronic or digital document signing using blockchain.

FIG. 2 shows a flow diagram 100 for electronic document signing using blockchain by a plurality of participants or users. As shown in FIG. 2, at 102, a participant, e.g., a sender, may access the document management provider 12 by logging into a website or mobile application (e.g., by inputting or otherwise providing credentials or other suitable authorization information). After the sender has gained accessed to the web site/mobile application, the sender can upload one or more documents for receipt of digital or electronic signature information (at 104). At 104, the sender also (if necessary) may sign the uploaded document(s) (e.g., by providing their digital or electronic signature information thereto).

Thereafter, at 106, the document(s) are sent or otherwise provided to other, additional participants (or receivers) for receipt of their validation or signature information. At 108, it may be determined whether the sender successfully uploaded, signed, or validated the document(s) (e.g., it may be determined whether the document or the signature information is correctly formatted or whether the participant or sender 101 properly validated the document). If success is determined at 108, the transaction details or information relating to the uploading, signing, or validation of the document(s) are generated and provided to one or more blocks in the blockchain 18 (at 110). Also, if success is determined at 108, the document(s) is provided to the cloud-based file storage platform 20 (e.g., IPFS or AWS S3).

If it is determined that the document(s) were not successfully uploaded, signed, or validated at 108, the sender may be prompted to correctly upload, sign, or validate the document(s), and steps/actions 104 to 110 can be repeated.

FIG. 2 further shows that, at 114, additional participants or receivers can log in to the website or mobile application (e.g., with their user credentials or other suitable verification information) to access and sign uploaded documents. When the receivers have logged in, the receivers can access the uploaded document(s), e.g., at 116 (for example, the document(s) can be accessed or received from the cloud-based storage 20), and further, at 116, the receivers can provide their electronic or digital signature information to the document(s).

Subsequently, at 118, a determination may be made as to whether the receivers successfully accessed or signed the document(s). If not, the receivers are prompted to correctly sign or validate the document(s). However, if it is determined that the document(s) has been successfully accessed and signed, the transaction details or information relating to the signing of the document(s) are generated and provided to one or more blocks in the blockchain 18 (e.g., at 120).

It will be further understood that any of steps or actions 102 to 120 shown in FIG. 2 can be omitted or rearranged without departing from the scope of the present disclosure. Additional actions or steps also can be included, and, for example, when all required participants have accessed and signed the document(s), the document(s) may be provided to the sender for validation, and transaction details or information related to the validation may be provided to one or more blocks in the blockchain 18.

Figure 3:
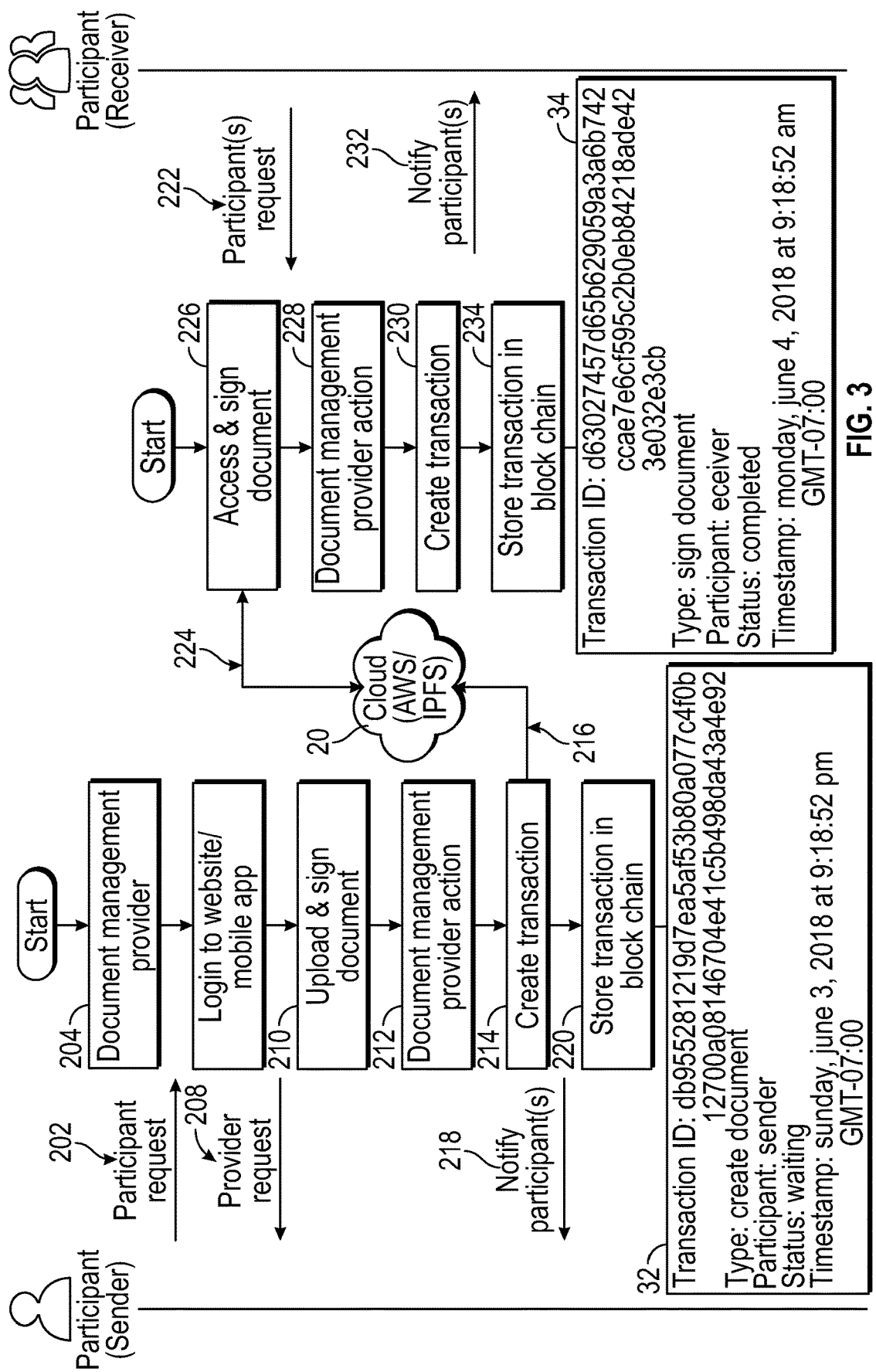
FIG. 3 shows a block diagram of a process for electronic or digital document signing using blockchain.

FIG. 3 shows a block diagram for a method or process 200 for electronic or digital document signing using blockchain. As shown in FIG. 3, a participant or sender may provide a request to launch or initiate a document management provider, e.g., the user may launch and access (e.g., using two-factor authentication) a website or mobile application associated with the document management provider (at 202). At 204, the document management provider is launched or initiated, and at 206, the sender may login to the website or mobile application of the document management provider, e.g., by inputting user credentials or other suitable authentication information.

Then, at 208, the document management provider generates and sends a request for the sender to upload and sign a document(s), and at 210, the sender may upload and sign one or more documents.

When the documents have been uploaded and signed, the document management provider takes one or more actions (at 212). For example, at 214, the document management provider creates a transaction, e.g., including creating transaction information, each time the sender uploads and/or signs a document. Further, upon creation of the transaction, the uploaded and signed document(s) are provided to and stored in a cloud-based file storage platform 20, e.g., AWS S3 or IPFS (at 216). The document management provider also notifies the sender (or other participants) that the transaction(s) has occurred/been created (at 218). In one variation, the document management provider provides a notification that the document(s) have be uploaded or signed by the sender. Additionally, at 220, the document management provider provides the transaction information to a block 32 in a blockchain.

As shown in block 32 in FIG. 3, the transaction information can include a transaction ID, a transaction type, a participant identifier, status information (e.g., an indication of whether additional participants have accessed and signed the uploaded documents), and a time stamp (e.g., including a time and date of when the transaction was created). In one variation, the transaction ID can include a hash of the uploaded and signed document(s) (e.g., by applying a cryptographic hash function to electronic data or information of the provided document(s)).

Additional participants or receivers may provide a request to access the website or mobile application at 222 (e.g., the receivers may launch or initiate and log into the website or mobile application of the document management provider).

While logged into the website/mobile application, at 226, the participants or receivers can access and sign the uploaded document(s), which are retrieved or otherwise accessed from the cloud-based storage 20 (at 224).

When the receivers have accessed and signed the uploaded document(s) at 226, the document management provider takes one or more actions at 228. For example, at 230, the document management provider creates a transaction, e.g., the document management provider can create transaction information. Upon creation of the transaction, the document management provider may notify the receivers or the sender at 232.

Additionally, at 234, the document management provider stores the transaction information in a block 34 of the blockchain 18. In one variation, the transaction information can include a transaction ID, a transaction type, a participant identifier, status information (e.g., indicating whether all additional participants have accessed and signed the uploaded documents), and a time stamp (e.g., including a time and date of when the transaction was created). The transaction ID can include a hash of the uploaded and signed document(s) (e.g., by applying a cryptographic hash function to electronic data or information of the document(s) including the digital signature information of the receivers).

It will be further understood that any of actions/steps 202 to 234 shown in FIG. 3 can be rearranged or omitted and additional steps/actions can be added, without departing from the scope of the present disclosure.

Figure 4:
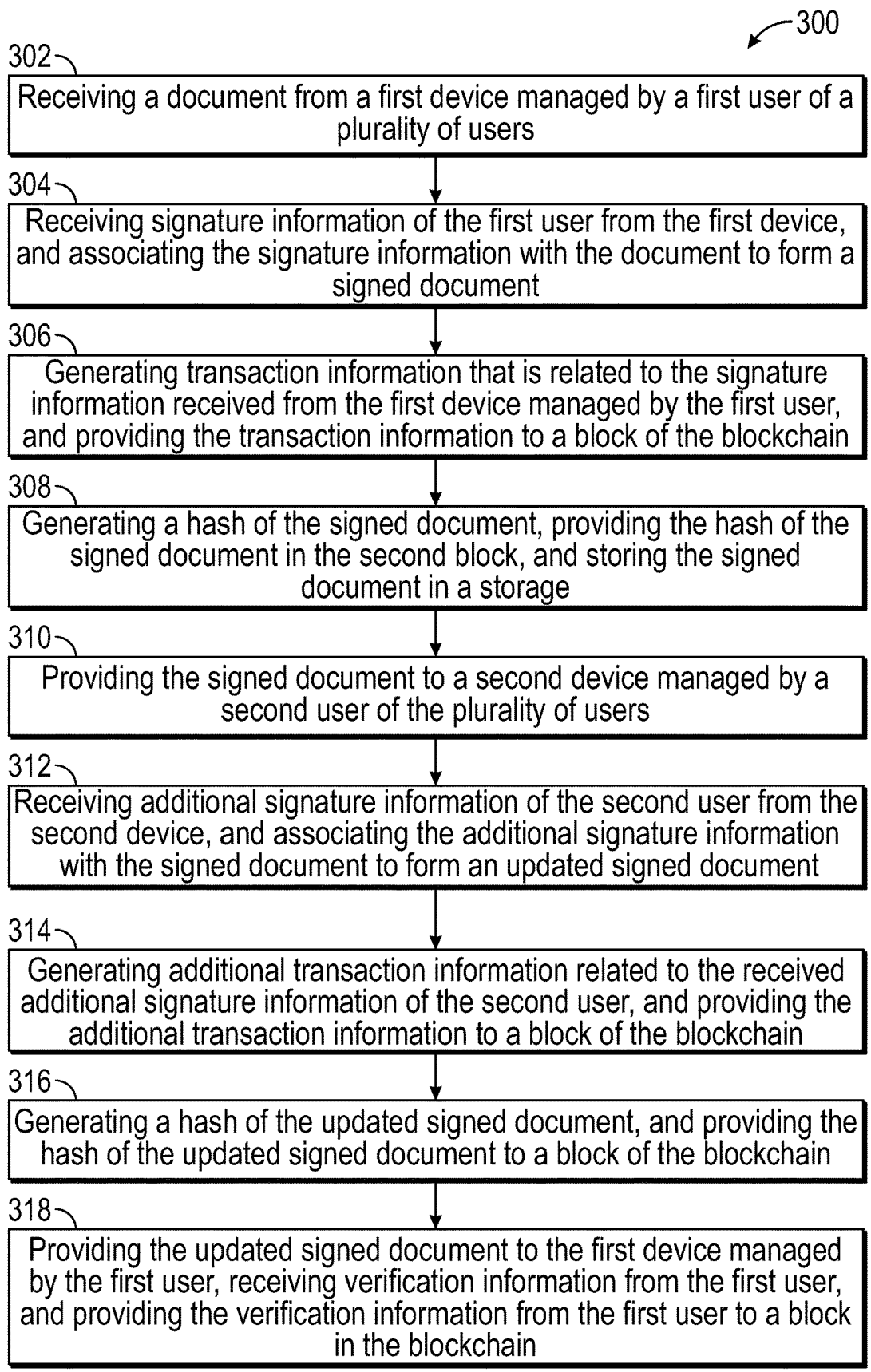
FIG. 4 shows a flow diagram for a process for electronic or digital document signing using blockchain.

FIG. 4 shows a block diagram of a method or process 300 for electronic document signing using blockchain. As shown in FIG. 4, at 302 the method or process 300 includes receiving a document(s) from a first device managed by a first user of a plurality of users. The method or process 300 also includes receiving electronic signature information of the first user from the first device, and associating the signature information with the documents to form a signed document (at 304).

Thereafter, at 306, transaction information related to the signature information received from the first user is generated and provided to a block of a current blockchain. At 308, a hash of the signed document is generated and a hash value is provided to a current block in the blockchain. Additionally, at 308, the signed document is provided or otherwise received at a document storage, such as a cloud-based storage platform or other suitable storage.

As further shown in FIG. 4, at 310, the signed document is provided to a second device managed by a second user of the plurality of users. At 312, additional signature information of the second user is received from the second device, and the additional signature information is associated with the signed document to form an updated signed document.

Subsequently, the method 300 includes generating additional transaction information related to the received additional signature information of the second user, and providing the additional transaction information to a block of the blockchain (at 314). In addition, at 316, a hash of the updated signed document is generated and a hash value is provided to a block of the blockchain.

At 318, the updated signed document is provided to the first device managed by the first user, and verification information is received from the first user (e.g., the first user can verify that the updated and signed document has been properly signed by all required users of the plurality of users). The verification information from the first user further is provided to a block in the blockchain.

Any of steps or actions 302 to 318 shown in FIG. 4 can be omitted or rearranged without departing from the scope of the present disclosure.

Additional steps or actions can be included. For example, the method further can include displaying information related or in the blockchain to provide a transaction history of the documents. In addition, the method can include providing the updated signed document to the first device managed by the first user, and receiving verification information from the first user. The verification information from the first user further also can be provided to a current block in the blockchain.

Figure 5A:
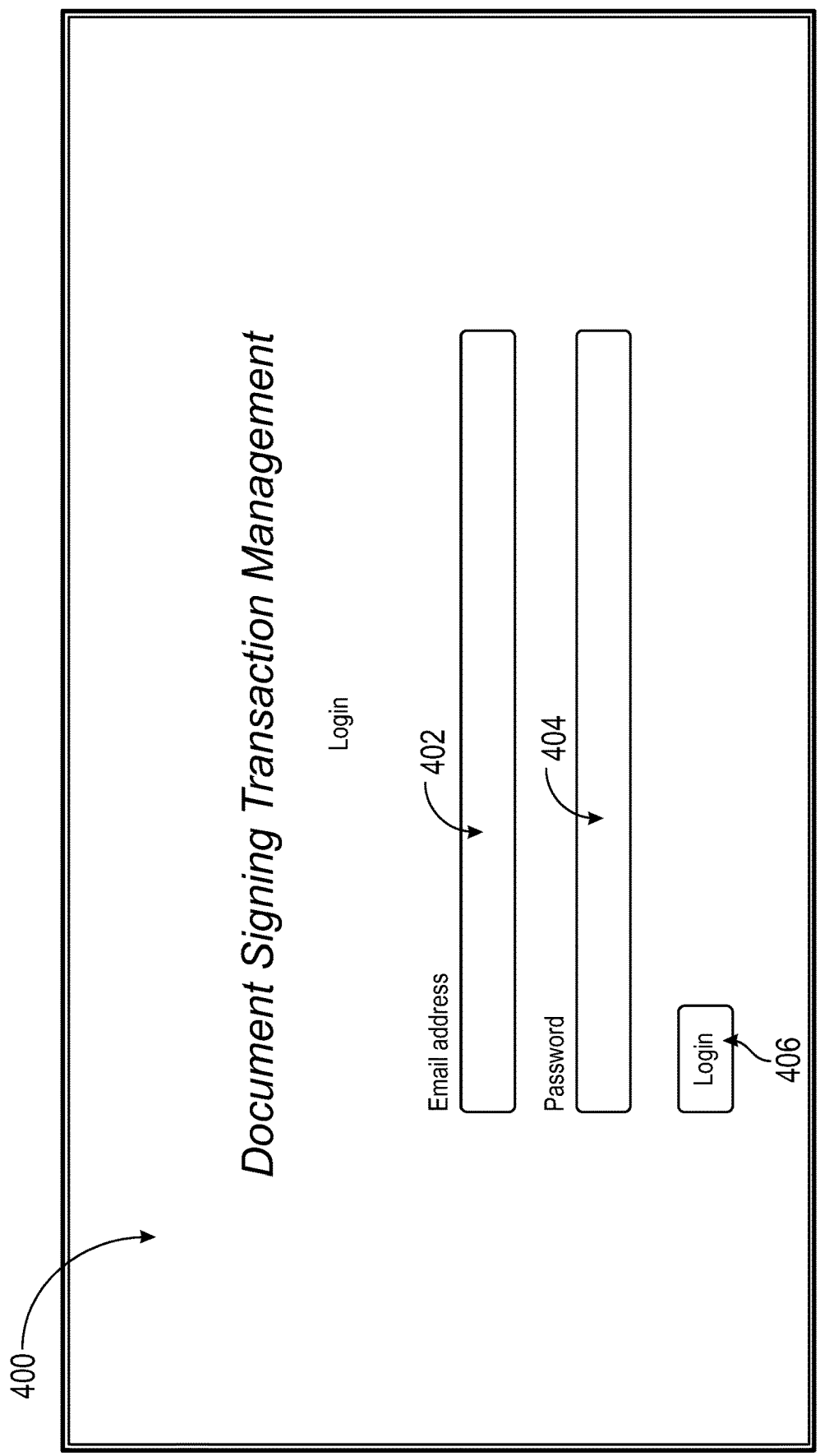
FIGS. 5A-5F show exemplary screenshots of a platform for electronic or digital document signing using blockchain.

FIGS. 5A-5F show an example screens for the document management provider 12 facilitating electronic or digital document signing using blockchain, which screens can be displayed on displays 40 of the user managed devices 16. FIG. 5A shows a login screen 400 for the document management provider 12 (e.g., which may be displayed or provided when participants launch or otherwise access the document management provider).

As shown in FIG. 5A, the login screen 400 may require multi-factor authentication, and have one or more text fields or input areas 402, 404 for a user/participant to enter or otherwise provide login credentials or other authentication information. For example, the login screen 400 may have at least two inputs 402 and 404 for participants to enter an email address and a password, respectively, and at least one selectable icon or area 406 that can be selected/activated by the participant/user (e.g., with their login credentials) to log or sign in into the document management provider 12.

Figure 5B:
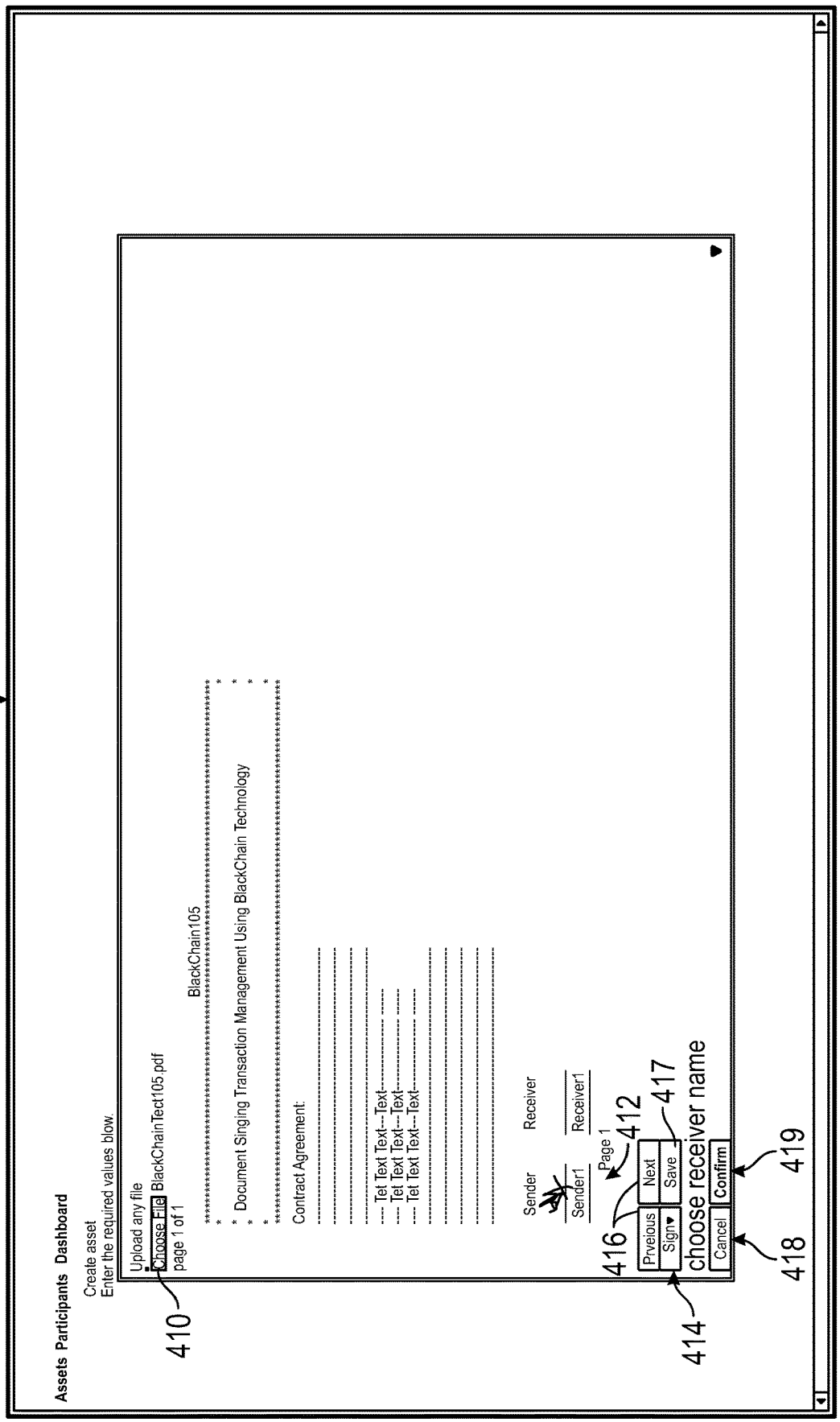

FIG. 5B shows an example document upload and signature screen 408 for participants (e.g., a sender) to upload and sign documents. The document upload and signature screen 408 can be shown when the participant logs or signs into the login screen 400. As shown in FIG. 5B, the screen 408 provides a selectable icon or area 410 that can be selected or activated to allow the sender to browse and choose a document file (e.g., ".pdf" document, ".doc" document, ".docx" document, ".tiff" documents, ".rtf" documents, ".odt" documents, etc.) to be uploaded to the document management provider. Any suitable means for accessing, selecting, or uploading documents may be used, however, without departing from the scope of the present disclosure. For example, in some variations, the screen 408 can include a field or area in which document icons can be selected and dragged to for uploading thereof.

FIG. 5B further shows that screen 408 further provides a selectable field or area 414 that allows the participants to enter or otherwise provide electronic or digital signature information to the uploaded document. For example, in some variations, participants can use an input of their managed device 16 (e.g., a mouse, touch screen, etc.) to write, type, or otherwise create their digital or electronic signature information. Additionally, or in the alternative, participants also can upload or otherwise provided their electronic signature information (e.g., a digital image of their initials or signature or other suitable electronic or digital signature information), for example, by selecting or activating one or more icons or areas 414.

In addition, the document upload and signature screen 408 can also include additional icons/selectable areas 416, 417, 418, and 419 that correspond to different functions of the document management provider. For example, the participants can select or activate one or more icons/areas 416 to toggle or move through various areas of the documents requiring signature information or to toggle through or select various uploaded documents for providing signature information thereto. The participants also can select or activate an icon/area 417 to save inputted, entered, or otherwise provided signature information.

Furthermore, participants can select or activate one or more icons 418 to confirm placement of their signature, and also may select an icon/area 419 to cancel out of the document upload and signature screen. When documents or signature information is received in the document upload and signature screen 408, the platform can generate a hash of the uploaded documents, create transactions and transaction information, and provide the hashes and transaction information to one or more blocks in the blockchain.

Figure 5C:
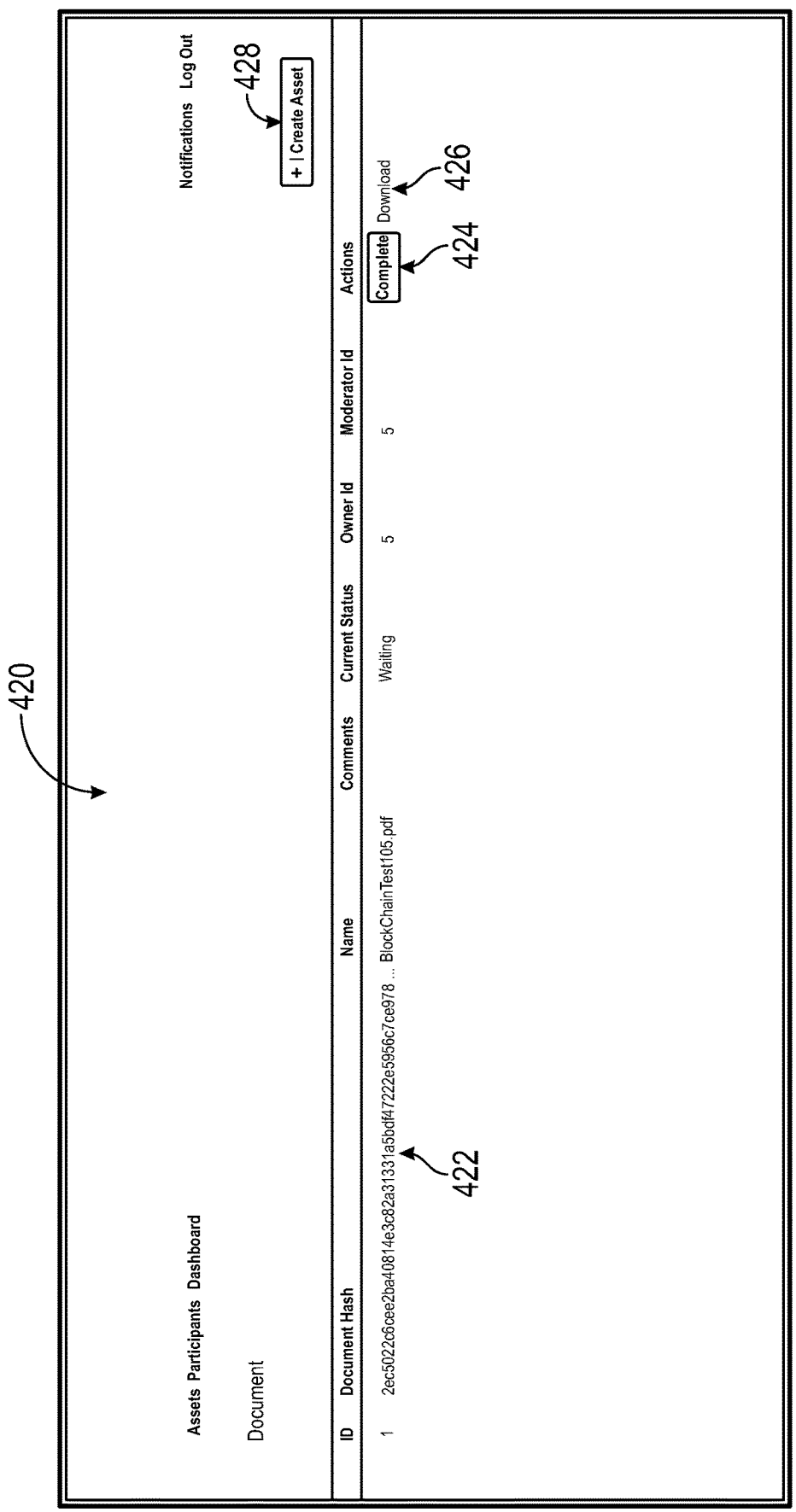

FIG. 5C shows an exemplary status screen 420 that provides a participant information or details of the status of a current transaction, e.g., which can represent information retrieved from the blockchain. The status screen 420 can be shown when a participant, e.g., a sender, confirms uploading and signing of document in screen 410 (e.g., by selecting the confirm icon/area 418 in FIG. 5B). In one variation, the status screen 420 can include a list, table, or other grouping 422 of transaction information/details including, e.g., a transaction ID or other identifier for the transaction, a document hash, a name of the document, any comments on the document (e.g., which can be entered/input by the sender), a status of the document, an owner ID for the document, a moderator ID for the document, any pending actions for the document (e.g., indicating whether the transaction is "complete" and all required participants have accessed and signed the upload document(s) or whether the document management provider is still "waiting" for all of the participants to access and sign the document). The status screen 420 also can include one or more selectable icons or areas 424 that can be selected to perform actions for the listed transactions (e.g., to sign or validate an uploaded document), as well one or more selectable icons/areas 426 that allow for the participant to download the transaction details/information. In addition, the status screen 420 can include one or more selectable icons/areas 428 that can be selected/activated to create additional transactions (e.g., upload, sign, or verify documents).

Figure 5D:
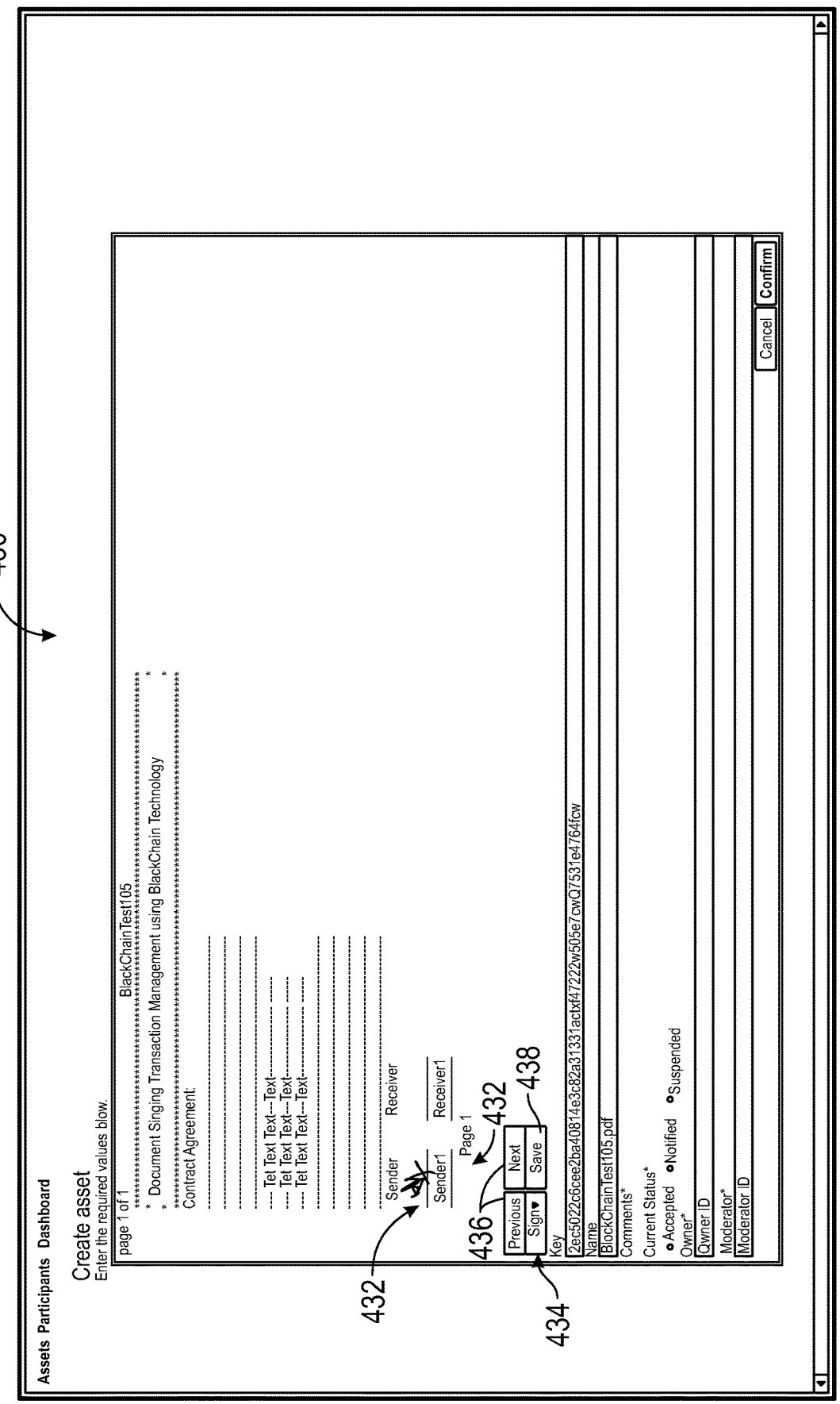

FIG. 5D shows a screenshot of a signature screen 430 that allows other or additional participants, e.g., receivers, to access and sign uploaded documents. The participants can access the signature screen 430 after providing two-factor authentication, e.g., entering login credentials or other authentication information in the login screen 400 displayed on their device. As shown in FIG. 5D, the signature screen 430 includes a selectable field or area 432 for the participants to provide their electronic or digital signature information (e.g., the participants can use an input of their managed device 16 to generate a digital signature or can otherwise provide signature information to the uploaded documents).

Additionally, or in the alternative, the participants can select or activate an area or icon 434 to upload or otherwise provided their electronic signature information (e.g., a digital image of their initials or signature or other suitable electronic or digital signature information). Each time the additional participants access uploaded documents or provided signature information in the signature screen 430 transactions and transaction information can be generated by the platform and provided to one or more blocks in the blockchain.

The signature screen 430 also can include additional icons/selectable areas 436, 438 that correspond to different functions of the document management provider. For example, the signature screen 430 can have one or more selectable areas or icons 436 that allow participants to select, toggle, or move between different parts of a document or between different documents requiring signature information. The signature screen 430 further can include a selectable area or icon that the receivers can select/activate to save inputted, entered, or otherwise provided signature information.

The signature screen 430 also can provide a list or grouping 439 of document or transaction information or details, such as a key or hash value of the document, a name of the document, comments on the document, status of the document, an owner of the document, a document moderator, etc. In one variation, the list or grouping of the document or transaction information/details can include selectable text fields that allow the receivers or other participants to edit or input document or transaction information or details.

Figure 5E:
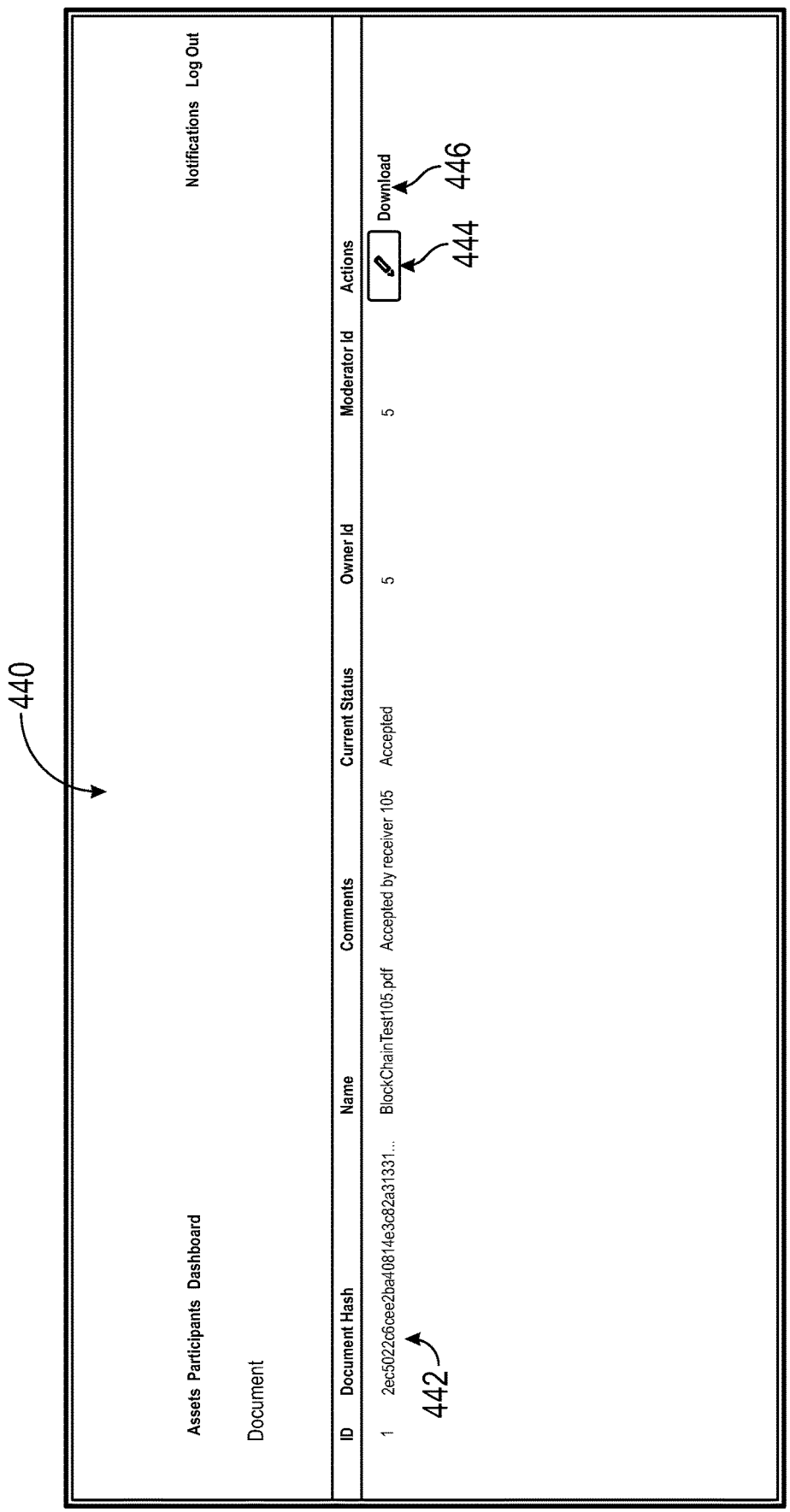

FIG. 5E shows a status screen 440 (e.g., which may be displayed when the participants/receivers provide their signature information to an uploaded document(s)). For example, as shown in FIG. 5E, the status screen 420 can include a list, table, or other grouping 442 of transaction information/details that can be retrieved from the blockchain including, e.g., a transaction ID or other identifier for the transaction, a document hash, a document name, comments on the document (e.g., which can be entered/input by the receiver or other participants), a status of the document, an owner ID for the document, a moderator ID for the document, any pending actions for the document (e.g., indicating whether the receiver's signature information has been "accepted"). The status screen 440 also can include one or more selectable icons or areas 444 that can be selected or activated to perform actions for the listed transactions (e.g., to sign or validate an uploaded document), as well one or more selectable icons/areas 446 that allow for the participants to download the transaction details/information.

Figure 5F:
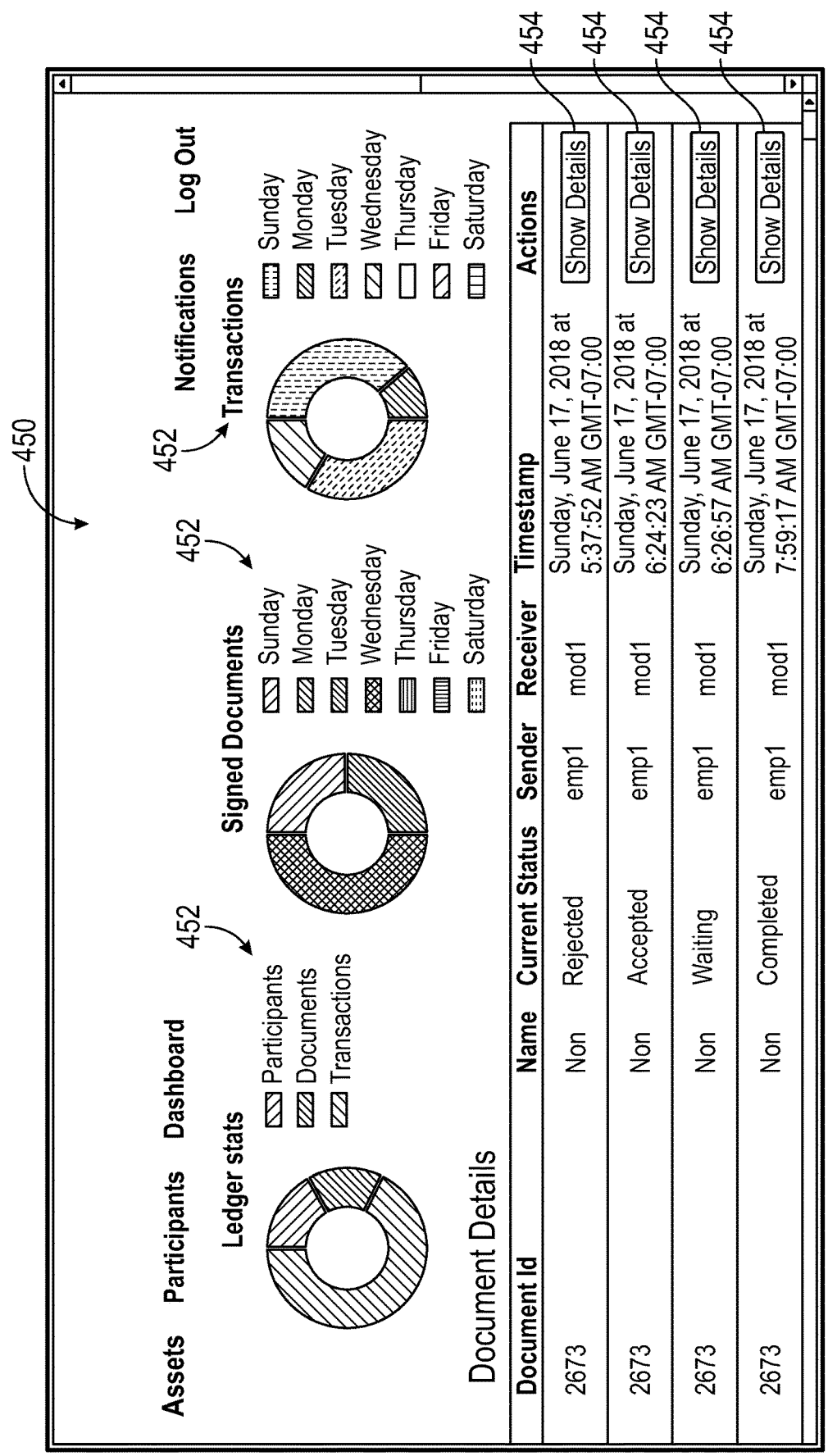

FIG. 5F shows a document/transaction details screen 450 providing document or transaction details, statistics, etc. In one variation, the screen 450 provides graphics or images 452 showing ledger stats, information on the signed documents, information on the transactions, which can be generated based at least in part upon information retrieved from the blockchain. The screen 450 further can include additional information/details on the transactions that were included in the blockchain, such as the document ID, the name of the document, the current status of the document, the sender of the document, the receiver of the document, and a time stamp. The document details also can provide selectable areas or icons 454 that can be selected/activated to show specific details of the documents. The transaction information/details can be related to or include information in the blockchain.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for electronic document signing, comprising:
receiving a document from a first device managed by a first user of a plurality of users;
generating a first hash of the document, and providing the first hash of the document in a block of a blockchain;
receiving first signature information of the first user from the first device;
forming a signed document by associating the first signature information with the document;
generating first transaction information that is related to the first signature information received from the first device managed by the first user, and providing the first transaction information to a block of the blockchain;
generating a second hash of the signed document, providing the second hash of the signed document in a block of the blockchain, and storing the signed document in a storage;
providing the signed document to a second device managed by a second user of the plurality of users; and then
receiving additional signature information of the second user from the second device;
forming an updated signed document by associating the additional signature information with the signed document;
generating additional transaction information related to the received additional signature information of the second user, and providing the additional transaction information to a block of the blockchain;
generating a third hash of the updated signed document, and providing the third hash of the updated signed document to a block of the blockchain;
providing the updated signed document to the first device managed by the first user;
receiving verification information from the first user via a selectable icon presented to the first user through a document management provider, the verification information verifies that the updated signed document has been properly signed; and
providing the verification information from the first user to a block in the blockchain.

2. The method of claim 1, further comprising displaying the blockchain to provide a transaction history of the document, the signed document, and the updated signed document.

3. The method of claim 1, wherein the first transaction information or the additional transaction information includes a transaction type, user information, a status of the document, and time or date information.

4. The method of claim 1, wherein the storage comprises a cloud based storage platform.

5. The method of claim 1, wherein the first signature information or the additional signature information includes electronic or digital signature information.

6. The method of claim 1, wherein generating a first hash of the document, or generating a second hash of the signed document, or generating a third hash of the updated signed document comprises applying a hash function to electronic data of the document, the signed document, or the updated signed document.

7. The method of claim 6, wherein the hash function comprises a SHA256 or RIPEMD function.

8. A system for electronic document signing, comprising:
a processor in communication with a plurality of devices each managed by a user, and in communication with a memory storing instructions that cause the processor to:
access a document from a first device managed by a first user of a plurality of users;
generate a first hash of the document, and provide the first hash of the document in a block of the blockchain;
receive first signature information of the first user from the first device, and associate the first signature information with the document to form a signed document;
generate first transaction information that is related to the first signature information received from the first device managed by the first user, and provide the first transaction information to a block of the blockchain;
generate a second hash of the signed document, provide the second hash of the signed document in the second block, and store the signed document in a storage;
provide the signed document to a second device managed by a second user of the plurality of users;
receive additional signature information of the second user from the second device, and associate the additional signature information with the signed document to form an updated signed document;
generate additional transaction information related to the received additional signature information of the second user, and provide the additional transaction information to a block of the blockchain;
generate a third hash of the updated signed document, and provide the third hash of the updated signed document to a block of the blockchain;
provide the updated signed document to the first device managed by the first user;
receive verification information from the first user via a selectable icon presented to the first user through a document management provider, the verification information verifies that the updated signed document has been properly signed; and
provide the verification information from the first user to a block in the blockchain.

9. The system of claim 8, wherein the processor further is configured to display the blockchain to provide a transaction history of the document, the signed document, and the updated signed document.

10. The system of claim 8, wherein the first transaction information and the additional transaction information includes a transaction type, participant information, a status of the document, and time and date information.

11. The system of claim 8, wherein the storage comprises a cloud based storage.

12. The system of claim 8, wherein the first signature information from the first user or the second signature information from the second user includes an e-signature or a digital signature.

13. The system of claim 8, wherein the processor further is configured to apply a hash function to electronic data of the document, the signed document, or the updated signed document.

14. The system of claim 13, wherein the hash function comprises a SHA256 or RIPEMD function.

15. The system of claim 8, wherein in the system comprises a website or a mobile application that is accessed by the plurality of users using two-factor authentication.

16. A method for electronic document signing, comprising:
displaying a login screen on a display of a first device managed by a first user of a plurality of users;
upon receiving first authentication information from the first user in one or more inputs in the login screen displayed on the display of the first device, displaying a document upload and signature screen on the display of the first device;
receiving a document from the first user through the document upload and signature screen;
receiving first signature information of the first user from the first device;
generating transaction details related to the receiving of the document, generating a hash of the document, and providing the transaction details and the hash of the document to a block of a blockchain;
displaying a login screen on a display of a second device managed by a second user of the plurality of users;
upon receiving authentication information from the second user in one or more inputs in the login screen displayed on the display of the second device, displaying a signature screen on the display of the second device including one or more inputs for receiving second signature information from the second user;
upon receiving the second signature information from the second user, generating additional transaction information related to the received second signature information of the second user, and providing the additional transaction information to a block of the blockchain;
providing an updated signed document including the first signature information and the second signature information to the first device managed by the first user;
receiving verification information from the first user via a selectable icon presented to the first user through a document management provider, the verification information verifies that the updated signed document has been properly signed; and
providing the verification information from the first user to a block in the blockchain.

17. The method of claim 1, further comprising:
generating and displaying a document and transaction details screen via the document management provider, the document and transaction details screen providing graphics representing information included in the blockchain including a verification status of the updated signed document.

18. The system of claim 8, wherein the processor further is configured to:

generate and display a document and transaction details screen via the document management provider, the document and transaction details screen providing graphics representing information included in the blockchain including a verification status of the updated signed document.

19. The method of claim 16, further comprising:
generating and displaying a document and transaction details screen via the document management provider, the document and transaction details screen providing graphics representing information included in the blockchain including a verification status of the updated signed document.

\* \* \* \* \*